United States Patent [19]

Pohl

[11] Patent Number: 5,648,313

[45] Date of Patent: Jul. 15, 1997

[54] METHOD FOR PRODUCTION OF ADSORPTION MATERIAL

[76] Inventor: Peter Pohl, Quitschenredder 8, 24242 Felde, Germany

[21] Appl. No.: 571,837

[22] PCT Filed: Jul. 1, 1994

[86] PCT No.: PCT/DE94/00758

§ 371 Date: Dec. 26, 1995

§ 102(e) Date: Dec. 26, 1995

[87] PCT Pub. No.: WO95/01836

PCT Pub. Date: Jan. 19, 1995

[30] Foreign Application Priority Data

Jul. 8, 1993 [DE] Germany .............. 43 22 743.0

[51] Int. Cl.$^6$ .................. B01J 20/22; C02F 1/42
[52] U.S. Cl. .................. 502/401; 210/688; 210/691
[58] Field of Search .................. 502/401; 210/688, 210/691

[56] References Cited

FOREIGN PATENT DOCUMENTS

| 2223078 | 4/1974 | France. |
|---|---|---|
| 4117234A1 | 3/1992 | Germany. |
| 62-171822 | 9/1987 | Japan. |
| 570544 | 10/1943 | United Kingdom. |
| PCT/US89/ 05811 | 12/1989 | WIPO. |

OTHER PUBLICATIONS

N. Kuyucak & B. Volesky The Mechanism of Cobalt Biosorption (vol. 33, pp. 823–831, 1989).

*Primary Examiner*—Glenn A. Caldarola
*Assistant Examiner*—In Suk Bullock
*Attorney, Agent, or Firm*—Larson & Larson, P.A.

[57] ABSTRACT

Preparing an adsorption material for treating waste water containing heavy metals. Brown algae is crushed, separated from an alginate, crushed and ground to form particles about 500–1000 um and then rinsed with seawater and fresh water and thereafter dried to form the adsorption material.

12 Claims, No Drawings

METHOD FOR PRODUCTION OF ADSORPTION MATERIAL

BACKGROUND OF THE INVENTION

The invention concerns a method for the production of adsorption material from brown algae and its application to the adsorption of harmful substances such as heavy metals, hydrocarbons and the like substances from waste water.

According to this classification a similar method is already known from the Japanese patent abstract JP 1-15 133 A2, C-592, dated 2 May 1989, Vol. 13/No. 187. However in this patent precious metals such as gold, silver and platinum are collected with the aid of encapsulated but otherwise untreated algae. After this the metals are extracted with a special solvent (e.g. mercaptoethanol). For encapsulation of the algae polymer substances such as polyacrylamide and gelatine are used.

However, due to their poor binding ability precious metals possess adsorption properties which are completely different to the heavy metals or even hydrocarbons which are to be extracted by this invention.

In the Japanese patent there is no special information about the production of the algal material.

In addition to this, a publication in "Biotechnology and Bioengineering", Vol. 33, p. 823–831, 1989, by authors Kuyucak and Volesky should be mentioned. In this article the suggestion is made to make use of the adsorption ability of a brown alga, *Ascophyllum nodosum*, to adsorb the heavy metal cobalt. However, other heavy metals were not examined. In this publication special mention is made of the fact that when the alginate is extracted from the adsorption material the cobalt uptake by the biomass decreases by 91%. So this method should be avoided. Essentially, the method described by Kuyucak and Volesky corresponds to the normal alginate production in which at present considerable amounts of residual material are left.

It is also known to the experts working in this field that living microscopic and macroscopic algae can bind heavy metals to their surfaces and can also take them up to a certain extent after a longer period of reaction time. This adsorption of heavy metals can also be effected by dead (dried or extracted) biomass of the algae, as described above. The inventor of the method put forward here has established that in particular cultivated microscopic brown algae have good heavy metal adsorbing properties. However, a disadvantage of these microscopic algae which are cultivated in the laboratory is that they are very expensive to produce due to the complex technical cultivation apparatus (fermenters).

In the production of alginates, however, large quantities of macroscopic brown algae are left over and are a cheap waste product.

Thus the aim of the invention is to develop a method for preparing and cleansing macroscopic brown algae, and also to investigate any further technical application, in particular with regard to the residual biomass of brown algae after the commercial extraction of alginates.

By these means the high cost of production of biomasses can be saved if for example Laminaria-, Ascophyllum-, Fucus-, Macrocystis- and Nereocystis species are used. These algae are now being collected on the coasts of different countries in large quantities for the production of alginates, and are prepared and pressed out under alkaline conditions. The liquid extract thus obtained contains the alginates which for instance are used as swelling agents. Alginates are polysaccharides with an acid character.

As a result of extraction by pressing following rough crashing, large quantities of wet and compact residual biomass are left. These contain mostly cell wall material and also considerable amounts of intact, i.e. undamaged cells, but also other substances which are still soluble such as mineral salts, proteins, soluble polysaccharides, odour substances and many others. This biomass is at present partly used as fertilizer on fields. But this is not without problems, as this material develops unpleasant smells when it decomposes. This already sets in particularly during storage.

Inspite of the known adsorption properties this residual biomass cannot be employed as adsorption and filter material for purifying water to gain drinking water from used water as the soluble substances are washed out of the material. Moreover, this material can only be stored for a short time before it decomposes and starts to smell.

SUMMARY OF THE INVENTION

The method put forward in this invention enables the problem described in the prior art to be solved in a way that is friendly to the environment and without the use of expensive chemicals. In the preferred embodiments advantageous developments of the method are suggested. In close connection to this it is further suggested how the material gained by this method can be employed, and how it can be reused by regeneration after a desorption process.

The basic material which is a waste product from normal alginate production (e.g. on the atlantic coast of France) can be obtained at very little expense as compared with fleshly collected algae.

In the course of this commercial alginate production process the brown algae are already crushed and treated with alkalines. In this way the (acid) alginic acid of the algae is transferred to water soluble alginates (K- and/or Na-alginates). These alginates are then pressed out of the algae. However, after this process there are still considerable amounts of alginates or alginic acids and also further soluble components (proteins, lipopolysaccharides, salts and other substances). According to the measurements carried out by the inventor these substances amount to up to 19% of the extruded algal material. For the method described in this patent this extruded algal material is reused. It would otherwise be a fairly worthless waste product which even as a fertilizer can only be used to a limited extent.

The particular advantage of this invention is the extraction which enables remaining soluble substances from the extruded algal material to be removed, amongst them the remaining alginates. For this purpose the algal material is first finely ground and then extracted twice alternately with sea water (with a high salt content) and fresh water (with a low salt content). By means of this process the algal cells are thoroughly broken up mechanically and in particular osmotically and freed from the remaining water soluble components. In this way, as is at present established by investigations, approximately 19 kg of soluble substances are removed from 100 kg of algal material.

In particular the grinding of the biomass to a particle size of 500–1000 μm is responsible to a great extent for the complete destruction of the algal cells, which enable the cell walls to be completely cleansed of the soluble components. This cleansing, first with sea water, improves the removal of the soluble components of the algal material to a considerable extent, as different osmotic conditions are used during this rinsing. The final rinsing with fresh water frees the algae of salt water residues or any remaining salt content.

The "rinsed" algal material thus obtained practically only consists of pure, solid and insoluble algal cell wall framework. As studies of the inventor show, this material is surprisingly able to bind heavy metals just as the alginates can. However, it is only by the utilization of solid adsorption material that the elimination of harmful substances from liquid waste water is economically viable, and technically controllable, with a justifiable expenditure. It is only possible to achieve an economically justifiable mechanical separation of the treated waste water from the adsorption material when solid adsorption material is used. However, the use of soluble alginates, whose ability to adsorb heavy metal is known in principle, is technically not possible for the elimination of heavy metals because it would be unjustifiably expensive to separate these alginates from the waste water.

SUMMARY OF THE INVENTION

It has been proved in experiments that the prepared adsorption material described in this invention is able to adsorb high quantities of cadmium, copper, nickel, lead, iron and zink.

BRIEF DESCRIPTION OF THE INVENTION

In the following pages the method employed is described in more detail using examples which were tried out.

As starting material the residual biomass of different algal species after alginate production is used. This biomass is still moist, is only roughly crushed, and still contains the above named soluble and non-soluble substances in considerable amounts. The particle size is between 5–10 mm.

This material is now further ground in a high-performance grinding unit with the addition of a 10-fold amount of sea water at normal temperature (approximately 25° C.) until a particle size of 500–1000 µm is reached. The amount of water added depends on the moisture content of the basic initial material. After this the sea water—algal material mixture is transferred to a stirring basin and stirred for 10 minutes. Then the mixture is separated by a separator into liquid and solid components. The liquid part is disposed of, as it contains the undesired solved components such as odour substances, salts, proteins etc.

The solid substances thus obtained are again put in a stirring basin and stirred for 10 minutes with the addition of approximately the 10-fold amount of sea water. Then the mixture is again separated into liquid and solid components by the separator. The liquid part can now either be disposed of or passed into the stirring basin which was used for the first extraction step. After this the solid component mass gained from the second extraction step is placed in a stirring basin with approximately the 10-fold amount of fresh water, and stirred again for 10 minutes, whereby the sea water salts are removed. Then again the liquid is separated out by the separator.

The remaining solid components (ground and purified algal material) are dried and can be used directly as adsorption or filter material. The equipment for these purifying steps is easy to set up and can be used in continuous operation.

In addition it is suggested that the extraction agent is pre-warmed to higher temperatures during preparation of the algal material, or that the algal material is boiled.

It is further suggested that the ground and purified algal material is embedded in alginates and not just added to the liquid as a powder. For this purpose the dried or still moist solid components are suspended to 5% in an approximately 6% aqueous solution of Na-alginate, and this suspension is then instilled via suitable pipettes into a 0,2 molar calcium chloride solution. By these means small particles of calcium alginate are formed in which the algal material is embedded. Here it is important that the alginate is present in the form of insoluble calcium alanate, whereas it is extracted from the algae in the form of soluble K- or Na-alginate. As Na-alginate already arises during production of the adsorption material it makes sense to use it and to transform it into Ca-alginate as described above. This solid Ca-alginate is not used as an adsorption agent but only as solid carrier material.

Other substances, such as polymer plastics or resins would also be suitable as carrier materials. It is only important that the algal material is strengthened by being embedded in a carrier material so that it is transferred to a structure which can more easily be filtered. Thus, according to the invention, solid spherical particles of insoluble Calcium alginate are formed with the solid components of the algal material embedded in them. This "granulate" enables (especially as filling material in cartridges) a higher flow-through of the solutions or waste waters which are to be treated.

If the material is in the form of a fine powder and not as a granulate an amount of approximately 1 kg would have to be added to 1 $m^3$ of waste water to reach the degree of reduction of harmful substances required. After about 10–30 minutes' mechanical mixing (stirring or shaking) the purified water can be separated from the solid matter containing the harmful substances (algal material with adsorbed contaminants) by a separator. However, the use of a granulate is preferable as due to the fineness and lightness of the algae powder dust may occur. The dust of the adsorption material is harmless (non-toxic), but would make work more difficult.

In the following passages the use of the dried algal material, or the granulate, is explained. Firstly the dried algal material can be directly added to solutions or waste waters. For this purpose, after adding the material the mixture is mechanically stirred or shaken for 10–30 minutes as required. Here the amounts and times for stirring/shaking depend of course on the content of heavy metals or organic substances which are to be filtered. The amount to be added when using dried algal material in solid form is between 1–2 kg per $m^3$ of the volume which is to be purified if it has a normal pollution content, and when the granulate is used, approximately 10 kg per $m^3$.

After the above-mentioned stirring time the added algal material is removed by filtration or centrifuging from the solutions or waste waters which are now purified. This algal material which is now contaminated with heavy metals can be regenerated.

For this purpose the algal material which is now contaminated with adsorbed harmful substances after filtration or centrifuging is first collected, and if heavy metals were adsorbed, is treated with diluted hydrochloric acid. By this means the heavy metals are desorbed from the algal material. This can be carried out more advantageously at a higher temperature. After this the algal material thus cleansed can be freed from the hydrochloric acid by washing it with tap water, or distilled water for special purposes if a higher degree of purity is necessary. Then the algal material can be used again for the adsorption of heavy metals.

If organic substances have been adsorbed to the algal material desorption is carried out by treating the loaded algal material with organic solvents.

In conclusion the above-mentioned possibility of using the algae material or the granulate as filling material for cartridges or something similar in continuous flow-through operations will now be described. Cartridges have the advantage that they surround a limited volume of algal material which can simply be exchanged and mechanically manipulated. For this process the dried algal material or the granulate is filled into a tube-shaped case or cartridge and the solutions or waste waters which are to be treated are conducted through this cartridge until a sensor at the outlet of the cartridge shows that the substances to be eliminated from the water are now being retained in too low quantities, and therefore are all in the outflow because the adsorption capacity of the cartridge is used up. The cartridge can then be replaced by a new one.

By the use of several cartridges connected in parallel at least one cartridge can be used in succession again for cleaning, while another circuit, for instance with solvent, can clean the cartridges which are switched off the first cleaning circuit. Thus a plant with continuous flow of waste water which is to be cleaned can be constructed. The special advantage here is that the volume of substances to be cleansed is much less. Thus a very great volume of waste water which is to be cleaned can be passed through the cartridge, and this cartridge can be cleaned by the desorption method with a very much smaller amount of hydrochloric acid. The same applies for solvents such as ethanol, methanol or similar substances.

The use of three cartridges is particularly advantageous as the cleaning of one cartridge combines two processes: firstly rinsing with the desorption solution and secondly the cleaning of this cartridge from the installation solution. Thus when at least three connections are installed different liquids can be pumped through each cartridge.

I claim:

1. A method for the production of an adsorption material for the adsorption of heavy metals, hydrocarbons and other harmful substances from waste water, the steps comprising, (a) crushing a brown algae to form a biomass, (b) extracting an alginate from the biomass, (c) crushing the biomass separated from the alginate to reduce particle size to about 5–10 um, (d) grinding the biomass from (c) in the presence of sea water until a particle size of about 500–1000 μm is achieved, (e) rinsing the biomass from (d) with seawater and separating a liquid and solid component, (f) rinsing the solid component from (e) with fresh water and (g) separating out a remaining solid component and drying the remaining solid component to obtain the adsorption material.

2. The method according to claim 1 wherein in a further step rinsing the biomass in step (e) with seawater a second time with a 10-fold amount, separating the biomass from the liquid and thereafter rinsing the biomass with a 10-fold amount of fresh water.

3. The method according to claim 1 wherein in a further step distilling the fresh water employed in step (f).

4. The method according to claim 2 wherein in a further step distilling the fresh water employed.

5. The method according to claim 1 wherein the rinsing steps are carried out at a temperature of about 25° C.

6. The method according to claim 1 wherein in a further step boiling the brown algae prior to step (a).

7. The method according to claim 1 wherein in a further step embedding the remaining solid dried component of step (g) in a granular polymer carrier material.

8. The method according to claim 1 wherein in a further step suspending the remaining solid dried component of step (g) in an aqueous solution of Na-alginate, instilling the suspension in a calcium chloride solution and separating out granular Ca-alginate particles from the calcium chloride solution.

9. The method according to claim 7 wherein in a further step suspending 5% of solid dried component in a 6% aqueous solution of Na-alginate and inserting the suspension into about 0.2 molar calcium chloride solution.

10. The method according to claim 1 wherein in a further step adding adsorption material from step (g) to waste water containing heavy metals, agitating and thereafter separating a resulting biomass from the waste water.

11. The method according to claim 9 wherein in a further step treating the resulting biomass with a desorption solution to remove entrapped heavy metal.

12. The method according to claim 1 wherein in a further step adding the adsorption material from step (g) to a cartridge for use in treating waste water containing heavy metal.

* * * * *